United States Patent
Breitgand et al.

(10) Patent No.: US 8,028,277 B2
(45) Date of Patent: Sep. 27, 2011

(54) SELF-HEALING SYSTEM AND METHOD FOR CODE OPTIMIZATION IN A COMPUTING ENVIRONMENT

(75) Inventors: David Breitgand, Modiin (IL); Maayan Goldstein, Holon (IL); Ealan Abraham Henis, Rehovot (IL); Onn Menahem Shehory, Neve-Monosson (IL); Yaron Weinsberg, Jerusalem (IL)

(73) Assignee: International Business Machines Corporation, Armonk, NY (US)

( * ) Notice: Subject to any disclaimer, the term of this patent is extended or adjusted under 35 U.S.C. 154(b) by 1163 days.

(21) Appl. No.: 11/751,044

(22) Filed: May 21, 2007

(65) Prior Publication Data

US 2008/0294942 A1 Nov. 27, 2008

(51) Int. Cl.
G06F 9/44 (2006.01)
G06F 9/45 (2006.01)

(52) U.S. Cl. .................. 717/130; 717/124; 717/151
(58) Field of Classification Search .......... 717/124–131, 717/151–155
See application file for complete search history.

(56) References Cited

U.S. PATENT DOCUMENTS

| | | | | |
|---|---|---|---|---|
| 5,450,586 A * | 9/1995 | Kuzara et al. | ................ | 717/124 |
| 6,035,122 A * | 3/2000 | Ando | ............................ | 717/155 |
| 6,192,511 B1 * | 2/2001 | Johnston et al. | ............. | 717/109 |
| 6,263,489 B1 * | 7/2001 | Olsen et al. | ................... | 717/129 |
| 6,324,683 B1 * | 11/2001 | Fuh et al. | ....................... | 717/124 |
| 6,434,741 B1 * | 8/2002 | Mirani et al. | ................. | 717/124 |
| 6,530,036 B1 | 3/2003 | Frey, Jr. | | |
| 6,553,565 B2 * | 4/2003 | Click et al. | ................... | 717/129 |
| 6,820,254 B2 * | 11/2004 | Smith et al. | ................... | 717/151 |
| 6,839,893 B2 * | 1/2005 | Bates et al. | ..................... | 717/124 |
| 6,961,925 B2 * | 11/2005 | Callahan et al. | ............. | 717/128 |
| 7,120,559 B1 | 10/2006 | Williams et al. | | |
| 7,228,531 B1 * | 6/2007 | Langhammer | ................ | 717/146 |
| 7,237,234 B2 * | 6/2007 | Granston et al. | ............. | 717/151 |
| 7,254,806 B1 * | 8/2007 | Yates et al. | ..................... | 717/136 |
| 7,275,242 B2 * | 9/2007 | Liu et al. | ......................... | 717/154 |
| 7,487,494 B2 * | 2/2009 | Chan et al. | ..................... | 717/127 |
| 7,490,319 B2 * | 2/2009 | Blackwell et al. | ............. | 717/124 |
| 7,496,894 B2 * | 2/2009 | Das | ................................ | 717/124 |
| 7,530,054 B2 * | 5/2009 | Reimer et al. | ................ | 717/125 |
| 7,539,977 B1 * | 5/2009 | Bloom | ........................ | 717/124 |
| 7,665,078 B2 * | 2/2010 | Liebenow | ...................... | 717/152 |
| 7,681,187 B2 * | 3/2010 | Ludwig et al. | ................ | 717/151 |
| 7,853,930 B2 * | 12/2010 | Mitchell et al. | ............... | 717/131 |
| 7,904,894 B2 * | 3/2011 | Entin et al. | ..................... | 717/151 |
| 7,926,048 B2 * | 4/2011 | Bratanov | ....................... | 717/155 |
| 2004/0123285 A1 | 6/2004 | Berg | | |
| 2005/0240621 A1 | 10/2005 | Robertson et al. | | |
| 2006/0010354 A1 | 1/2006 | Azavedo et al. | | |
| 2006/0143595 A1 | 6/2006 | Dostert et al. | | |

(Continued)

OTHER PUBLICATIONS

Kotzmann et al, "Run time support for optimizations based on escape analysis", IEEE CGO, pp. 49-60, 2007.*

(Continued)

*Primary Examiner* — Anil Khatri
(74) *Attorney, Agent, or Firm* — Jason Far-Hadian

(57) ABSTRACT

Systems and methods for optimizing performance in a computing environment are provided. The system comprises means for monitoring execution of annotated logic code associated with a software component to determine whether a condition has been satisfied, wherein annotations in the logic code provide one or more details about the software component, the details being useful to a healing agent to correct a problem associated with said condition during the execution of the logic code.

17 Claims, 5 Drawing Sheets

U.S. PATENT DOCUMENTS

2006/0168492 A1  7/2006  Haselden et al.

OTHER PUBLICATIONS

Tuck et al, "SoftSig: Software exposed hardware signatures for code analysis and optimization", ACM ASPLOS, pp. 145-156, 2008.*

Kumar et al, "Transparent debuggng of dynamiclaly optimized code", IEEE, pp. 275-286, 2009.*

Koushanfar et al, "Symbolic debugging scheme for optimized hardware and software", IEEE, pp. 40-43, 2000.*

J. Park et al., "Proactive self-healing system for application maintenance in ubiquitous computing environment", *Lecture Notes in Computer Science (including subseries Lecture Notes in Artificial Intelligence and Lecture Notes in Bioinformatics)*, v 3981 LNCS, *Computational Science and Its Applications—ICCSA 2006: International Conference, Proceedings—Part II*, 2006, p. 430-440.

M. Crevar et al., "Getting the Most Out of Your High-End UNIX and NT Server with SAS", (*Source*: http://www2.sas.com/proceedings/sugi26/p268-26.pdf).

M. Cox et al., "Application-controlled demand paging for out-of-core visualization" (*Source*: http://citeseer.ist.psu.edu/cache/papers/cs/16613/http:zSzzSzwww.nas.nasa.govzSzPubszSzT010.pdf/cox97applicationcontrolled.pdf).

O. Cozette et al, "Adaptive paging for a multifrontal solver", Proceedings of the International Conference on Supercomputing, 2004 International Conference on Supercomputing, 2004, p. 267-276.

D. Chakravarty et al., "Performance implications of paging on a distributed open system", CMG Proceedings, v 2, 1994, p. 914-921 (Abstract only).

R. Barve et al., "Application-controlled paging for shared cache" (*Source*: http://citeseer.ist.psu.edu/cache/papers/cs/3217/http:zSzzSzwww.cs.duke.eduzSz~rbarvezSzshort_paging.pdf/application-controlled-paging-for.pdf).

Crouse et al., "Self-Healing RAM Management Algorithm", (*Source*: http://www.priorartdatabase.com/IPCOM/000043867/).

\* cited by examiner

SELF-HEALING SYSTEM AND METHOD FOR CODE OPTIMIZATION IN A COMPUTING ENVIRONMENT

COPYRIGHT & TRADEMARK NOTICES

A portion of the disclosure of this patent document contains material, which is subject to copyright protection. The owner has no objection to the facsimile reproduction by any one of the patent document or the patent disclosure, as it appears in the Patent and Trademark Office patent file or records, but otherwise reserves all copyrights whatsoever.

Certain marks referenced herein may be common law or registered trademarks of third parties affiliated or unaffiliated with the applicant or the assignee. Use of these marks is for providing an enabling disclosure by way of example and shall not be construed to limit the scope of this invention to material associated with such marks.

FIELD OF INVENTION

The present invention relates generally to computing systems and, more particularly, to a system and method for implementing logic code that can improve performance in a computing system by intelligently utilizing annotations embedded in the logic code.

BACKGROUND

Self-healing software systems are designed to overcome problems occurring during testing and run time, and to improve overall system behavior. Generally, a self-healing system monitors system performance and provides a solution to a detected problem or prevents a predicted problem from occurring.

In current self-healing systems, the problems are vertically detected when certain events occur at various system layers (e.g., hardware and software). Specific events may be associated with healing agents that provide a specific solution to a predictable problem. Thus, when a certain event is detected, a corresponding healing agent is activated to address the respective problems. In summary, in the current self-healing systems, certain events are monitored and analyzed to detect and solve predictable problems in a specific manner.

Unfortunately, however, current methods for implementing self-healing software code are cumbersome, because these methods require detailed analysis of the detected events at runtime and involvement of a highly skilled staff that can understand the internal design of the software and complex programming languages or standards (e.g., Aspects™, Java Beans™, Enterprise Java Bean (EJB)™, etc.). Further, a very high level of overhead can be associated with some self-healing implementations (e.g., Aspects).

Therefore, self-healing methods and systems are needed that can overcome the aforementioned shortcomings by providing less complicated and less burdensome means to understand the nature of the detected events and the context in which the events are detected.

SUMMARY

The present disclosure is directed to a system and corresponding methods that facilitate optimizing performance in a computing environment.

For purposes of summarizing, certain aspects, advantages, and novel features of the invention have been described herein. It is to be understood that not all such advantages may be achieved in accordance with any one particular embodiment of the invention. Thus, the invention may be embodied or carried out in a manner that achieves or optimizes one advantage or group of advantages without achieving all advantages as may be taught or suggested herein.

In accordance with one embodiment, a method for optimizing performance in a computing environment is provided. The method comprises annotating logic code associated with a software component; and monitoring execution of the annotated logic code to determine whether a condition has been satisfied, wherein annotations in the logic code provide one or more details about the software component, the details being useful to a healing agent to correct a problem associated with said condition during the execution of the logic code.

The method further comprises invoking a healing agent to correct the problem according to the one or more details. The one or more details may provide information about a logic category or type to which the software component belongs or information about a parameter of relevance to healing of the software component. In some embodiments, the one or more details provide information about a preferred healing procedure or a first healing procedure to be performed by the healing agent.

In accordance with one embodiment, the one or more details provide information about the condition in response to which the healing agent is invoked. The logic code for the healing agent is preferably embedded in the software component. That is, in certain embodiments, the logic code for the healing agent is independent of the software component, so that a first healing logic code for correcting the problem can be replaced by a second healing logic code without substantially modifying logic code for the software component.

In accordance with another aspect of the invention a system for optimizing performance in a computing environment is provided. The system comprises means for monitoring execution of annotated logic code associated with a software component to determine whether a condition has been satisfied, wherein annotations in the logic code provide one or more details about the software component, the details being useful to a healing agent to correct a problem associated with said condition during the execution of the logic code.

In accordance with yet another aspect of the invention, a computer program product comprising a computer useable medium having a computer readable program is provided, wherein the computer readable program when executed on a computer causes the computer to monitor execution of annotated logic code associated with a software component to determine whether a condition has been satisfied, wherein annotations in the logic code provide one or more details about the software component, the details being useful to a healing agent to correct a problem associated with said condition during the execution of the logic code.

One or more of the above-disclosed embodiments in addition to certain alternatives are provided in further detail below with reference to the attached figures. The invention is not, however, limited to any particular embodiment disclosed.

BRIEF DESCRIPTION OF THE DRAWINGS

Embodiments of the present invention are understood by referring to the figures in the attached drawings, as provided below.

Features, elements, and aspects of the invention that are referenced by the same numerals in different figures represent the same, equivalent, or similar features, elements, or aspects, in accordance with one or more embodiments.

DETAILED DESCRIPTION OF EXEMPLARY EMBODIMENTS

The present disclosure is directed to systems and corresponding methods that facilitate improving performance in a computing system by intelligently utilizing annotations embedded in the logic code.

In the following, numerous specific details are set forth to provide a thorough description of various embodiments of the invention. Certain embodiments of the invention may be practiced without these specific details or with some variations in detail. In some instances, certain features are described in less detail so as not to obscure other aspects of the invention. The level of detail associated with each of the elements or features should not be construed to qualify the novelty or importance of one feature over the others.

Figure 1:
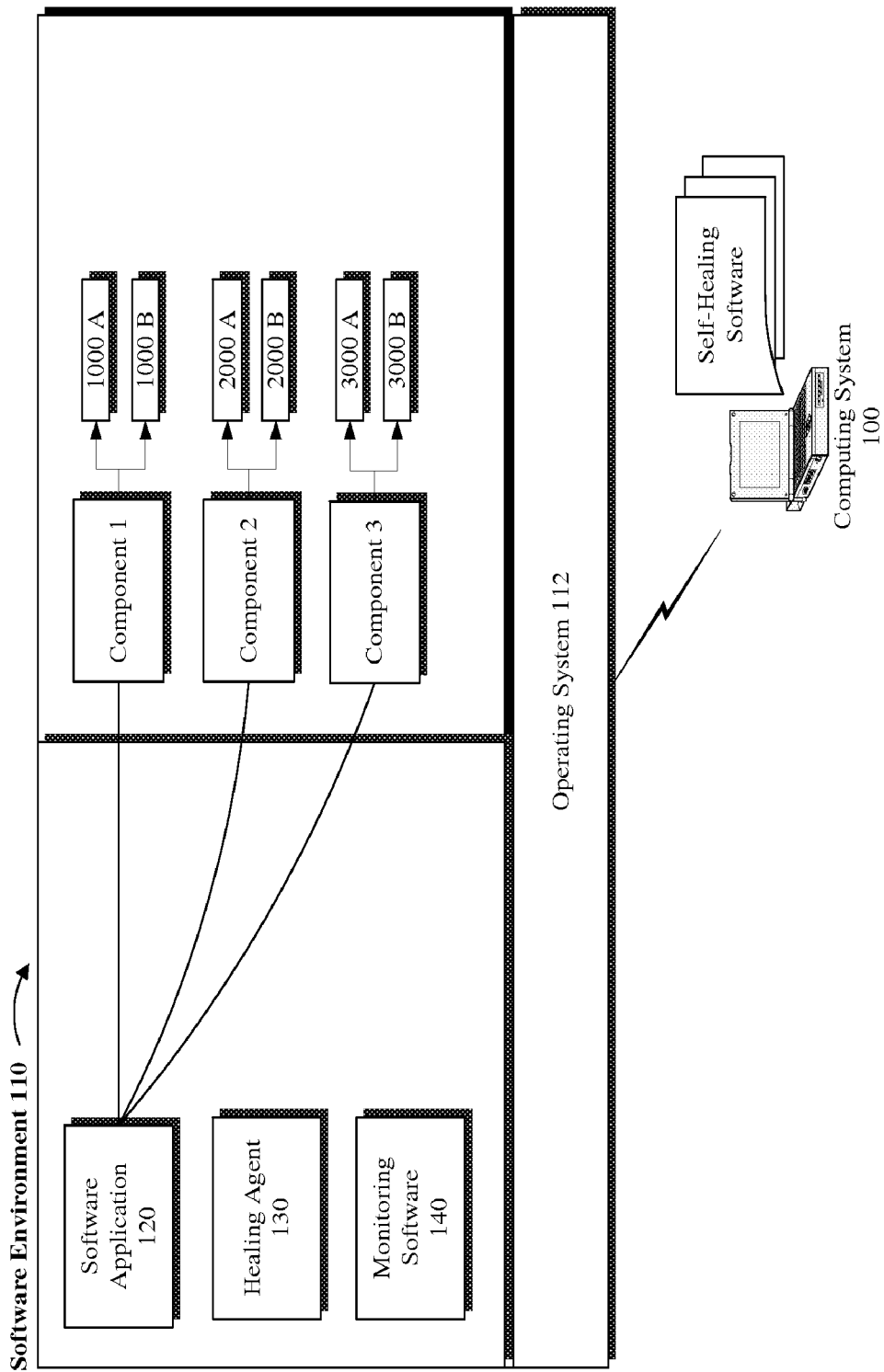
FIG. 1 illustrates an exemplary software environment in accordance with one or more embodiments of the invention, wherein a self-healing software may run.

Referring to FIG. 1, an exemplary runtime environment illustrated as software environment 110 comprises an operating system 112 executed over a computing system 100. In accordance with one aspect of the invention, software environment 110 supports a self-healing system, wherein a self-healing software application 120 can be executed on top of operating system 112.

Software application 120 may comprise a plurality of software components (e.g., components 1, 2, 3, etc.). The software components may comprise logic code, software application, program code or any other logic routines that may be annotated by way of human interaction or an automated operation that allows for inclusion of annotations in logic code.

As shown in FIG. 1, component 1 may include annotations 1000A and 1000B; component 2 may include annotations 2000A and 2000B; and component 3 may include annotations 3000A and 3000B, for example. Preferably said annotations are not executable, but are informative at runtime or, in some embodiments, can be manually or automatically replaced by, or converted to executable code, such that a healing agent 130 or a monitoring software 140 can utilize said annotations to detect problems and provide solutions that optimize execution of software application 120 in software environment 110.

Figure 2:
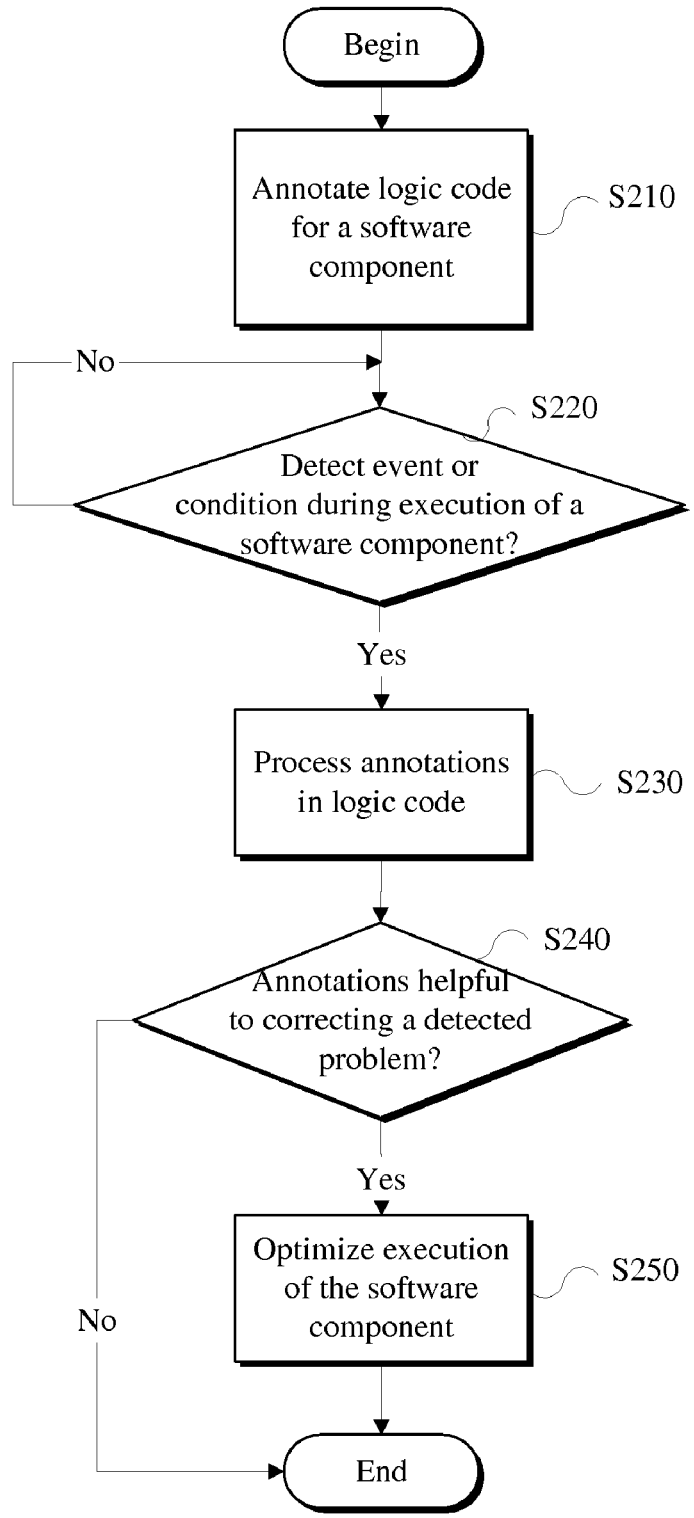
FIG. 2 is a flow diagram of a method for optimizing a computing system using a healing agent, in accordance with one embodiment.

Referring to FIG. 2, in accordance with one embodiment, annotations are inserted into the logic code for components of software application 120 (S210), preferably at design and coding time, to later serve as an interface for runtime monitoring, managing, configuring and healing of the annotated system components. Healing agent 130 may provide self-healing capabilities suited for a variety of application types, such that in the runtime environment, healing agent 130 is automatically invoked, by the monitoring software 140, for example, to optimize and heal the software application 120.

In accordance with one or more exemplary embodiments, where a software component's execution can predictably lead to a problem (e.g., excessive CPU utilization, memory overflow, etc.), annotations can be embedded in that software's component to provide detailed information about the software component, so that the details will be useful to a healing agent 130 to correct the problem. To detect a problem, monitoring software 140 monitors the execution environment for events or conditions that correspond to or can trigger certain problems. For example, monitoring software 140 may monitor parameters associated with memory usage or CPU cycles to determine if the available memory is about to fall below a minimum threshold, or whether the CPU is at a peak utilization capacity.

When an event or condition is detected that indicates a problem may arise during the execution of a software component (S220), annotations embedded in the respective logic code for the software component are processed by monitoring software 140, for example (S230) to determine if the annotations may be helpful in correcting a detected problem (S240). If so, the results obtained from processing the annotations are used to optimize the execution of the respective software component (S250), as provided in more detail below.

In some embodiments, annotations may be processed (S230) prior, during or after the detection of any event or condition (S220) without detracting from the scope of the invention, allowing for annotation processing so that certain events of interest can be detected in advance. In accordance with one aspect of the invention, software application 120 and its components may be implemented in two stages: (1) application logic programming and (2) self-healing overlay programming. The first stage is associated with the process of designing the basic logic of software application 120. The second stage is associated with enabling software application's 120 components with self-healing properties.

As provided earlier, a set of target components for self-healing are identified and decorated using annotations to define the healing properties. The runtime framework automatically and transparently may create proxy objects (e.g., placeholder objects) for the self-healing enabled components. The proxy objects provide a self-healing overlay through which a healing agent 130 may monitor, manage, configure and optimize the healing enabled components.

In one embodiment, a self-healing enabled component is a component with a logic code that comprises embedded annotations. The embedded annotations may define at least one of a logic category, class or type to which the software component belongs. In certain embodiments, the annotations provide information about a parameter (or a set of parameters) of relevance to healing of the software component or one or more preferred healing procedure, for example. The annotations may also provide one or more details about a certain healing procedure to be performed by a certain healing agent, or information about the condition in response to which the healing agent is to be invoked.

In some embodiments, the logic code for the self-healing software application 120 is separately implemented and maintained from the logic code for the healing agent 130. Such separation is advantageous in that it allows for the algorithm in the healing agent 130 to be easily distinguished, maintained and optionally replaced by another algorithm while leaving the logic code for software application 120 and its components intact.

Depending on implementation, various methods can be used to annotate components of software application 120. For example, special annotation software or an integrated annotation interface in software application 120 may be utilized to embed the annotations in a software component's logic code prior to execution. Once a component is annotated, the component is identified and categorized as healing enabled, for example.

When the logic code for software application 120 or its healing enabled components is executed, runtime monitoring software 140 intercepts the instantiation and initialization of the objects that correspond to the executed components. In an exemplary embodiment, the runtime monitoring software 140 comprises a class loader to inspect a healing enabled component prior to the component's instantiation and registers the component with a runtime managing module or operating system 112, for example.

In some embodiments, the class loader identifies the embedded annotations in the logic code, handles the annotations and registers the component as noted above. As part of the components' registration process an object belonging to a certain class (e.g., a class corresponding to monitoring software 140) may be constructed and associated with one or more classes that correspond to one or more healing enabled components. Preferably, the registered class object holds the run-time information about the healing enabled components.

The registered class, in one embodiment, comprises a processed view of a component's annotations and may be used to control a component's instrumentation at runtime. For example, the defined registered class may correspond to a manageable object, so that when a reference for the registered class is obtained, the corresponding object can be queried regarding the component's annotations, and the component's runtime behavior can be controlled.

In an exemplary embodiment, the annotations entered into the logic code are Java annotations devised to support self-healing and optimization. The annotations are configured to enable a developer to annotate a given component either at class level or method and field level. A class level annotation applies to a component, preferably as a whole logic unit, whereas a method and field level annotation provides more details that can be used to resolve a detected problem during execution Depending on implementation, different categories of annotation may be included in the logic code for a component. In one embodiment, an execution category annotation may apply to class methods, types and fields to categorize a given element to a known category relevant to self-healing. For example, an annotation may indicate that the developer of a component believes that CPU and IO are major factors impacted by the run time behavior of a component (or vice versa) and therefore important for its healing.

In a certain embodiment, healing agent 130 may be implemented to provide automated instructions on how to generate annotations to be embedded in a component's logic code. Healing agent 130 may advantageously also indicate the type, category and location in which the annotations should be inserted in the logic code. The automated addition of annotation may be assisted by code that analyzes needs, types and locations of annotations to be inserted in the logic code.

One or more elements (e.g., methods, types and fields) of an annotated component may share a category. An element may be annotated by defining several standard execution categories such as IO, CPU, MEMORY and NETWORK, for example. A developer may also define custom categories. In the following, certain exemplary custom categories are discussed in detail. It is noteworthy, however, that the scope of the invention should not be construed as limited to such exemplary embodiments.

Healer Agent Annotation—The healer agent annotation associates the annotated component with a specific set of healing agents 130 in the context of specific metric types and in relation to the execution category annotation. At runtime, the healer agent annotation results in the runtime monitoring software 140 instantiating a healing agent 130. The healing agent 130 may, using the runtime monitor software 140 application programming interfaces (APIs), register with several system events (e.g., CPU utilization, page faults, etc.).

In one embodiment, event monitoring is implemented using standard approaches (e.g., the java Event Listener), incurring known overheads associated with each event. By monitoring for events, healing agent 30 can detect problem symptoms and react upon them to heal the problem. In a case where a method level healing agent is associated with a metric type with which a level healing agent is associated, the method level healing agent overrides the class level healing agent. In one embodiment, the annotations may specify equally sized vectors, which associate metric types with one or more appropriate healing agents.

Define Latency Monitor Annotation—The following represents an exemplary logic code (i.e., method) that is annotated with a latency monitor type annotation.

```
/**
 * Sample IO related method with a latency
 * monitoring and specific healer attached.
 */
@ExecutionCategory(IO)
@DefineLatencyMonitor(healer=IOLatencyHealer.class,
    predicate=MyPredicate.class,frequency=5,enable=true)
public void IOMethod(int time) {
    DoIOBenchmark(time);
}
/**
 * The IOMethod predicate notifies the healer
 * of threshold violations.
 */
public class MyPredicate implements PanaceaPredicate {
    public boolean OnPanaceaEvent(
        Manageable targetComponent,
        PanaceaClass meta,PanaceaEvent evt,
        StackTraceElement[ ] stack) {
        if (evt instanceof LatencyMonitorEvent) {
            LatencyMonitorEvent
                levt = (LatencyMonitorEvent)evt;
            Long latency =
            (Long)levt.GetMeasuredValue( ));
            return (latency > threshold);
        }
        return false;
    }
}
```

The purpose of the above annotation is to transparently instrument a given method to produce a latency measurement. In this example, the annotation defines four attributes: (1) Healer—the healing agent that handles the latency related events. (2) Predicate—a predicate object of which the returned value indicates whether a healing operation is to be performed. For example, the predicate may check whether the measured latency was greater than a predefined threshold. (3) Frequency—dictates how often the runtime should report the measurement. (4) Enable—a Boolean flag indicating whether the annotation is enabled. In case a developer does not indicate the healer attribute, then the class level healing agent that is associated with the metric type latency is used instead.

In accordance with one aspect of the invention, two categories of healing agents are provided, application specific and generic healing agents. Application specific healing agents comprise healers written for specific applications. Such healers are implemented with application specific knowledge and provide a detailed level of healing and optimization for a specific application. Generic healing agents, on the other hand, are implemented to be applied to a variety of application classes.

Generic healing agents are classified according to the generic problem class that is healed. These types of agents may be further classified according to tradeoffs between the improved status of healed properties and the deterioration in the status of other properties. Preferably, generic healers provide a less detailed level of healing due to their broad application to a plurality of problems.

In certain embodiments, healing agents cover an abstract healer class (e.g., a core healer class). Healing agents may register for events and implement an event method that allows the healing agents to receive component level events and system level events. A method signature is presented in the logic code provided above within the MyPredicate class. The arguments are: (1) targetComponent—points to the managed component; (2) evt—the event(s) listened for (e.g., object creation events, monitoring events, etc.); (3) stack—the relevant stack trace elements of the thread which triggered the event.

In addition to implementing standard interfaces, a healing agent may also implement some healing-specific logic. Examples of generic healers are provided below, without detracting from the scope of the invention.

SyncSwitchHealer—In accordance with one embodiment, this healer attempts to either increase application throughput, or reduce CPU utilization, by altering components' invocation model at runtime. Accordingly, a synchronous invocation is one where the caller blocks waiting for the answer, and an asynchronous invocation is one where the caller does not block. Asynchronous invocations enable better utilization of the processing power and increases application throughput.

ObjectPoolHealer—In accordance with one embodiment, this healer dynamically creates object pools to allow object reuse in cases where object reinstantiation introduces undesirable delays in response time. As distinguishable from common implementations of object pooling, the ObjectPool healer is preferably used in cases where the managed application does not implement object pools, or the implemented pools handle only certain classes of objects, but not others. The ObjectPool healer identifies opportunities for object reuse which are not handled by the application's pools, and dynamically creates pools to handle these cases.

In one embodiment, the ObjectPool healer registers for object instantiation events of components annotated as manageable components and measures the latency of the instantiation process. It also listens for response time threshold violation events at the system level. In cases where the latter occur in correlation with the instantiation process of monitored objects, the ObjectPool healer transparently attempts to create an object pool for those objects. The healer may receive feedback from the runtime monitoring software 140 to dynamically determine the pool's size.

ObjectDumpHealer—In accordance with one embodiment, this healer monitors memory utilization, page-faults per second and CPU utilization and may decide, according to its algorithm, to store memory resident objects to secondary memory and release the memory allocated to them. By moving objects from primary memory to secondary memory, the ObjectDump healer frees resources. The healer uses a configurable "object-dump" policy in order to decide which components should be removed from the primary memory first.

Figure 3:
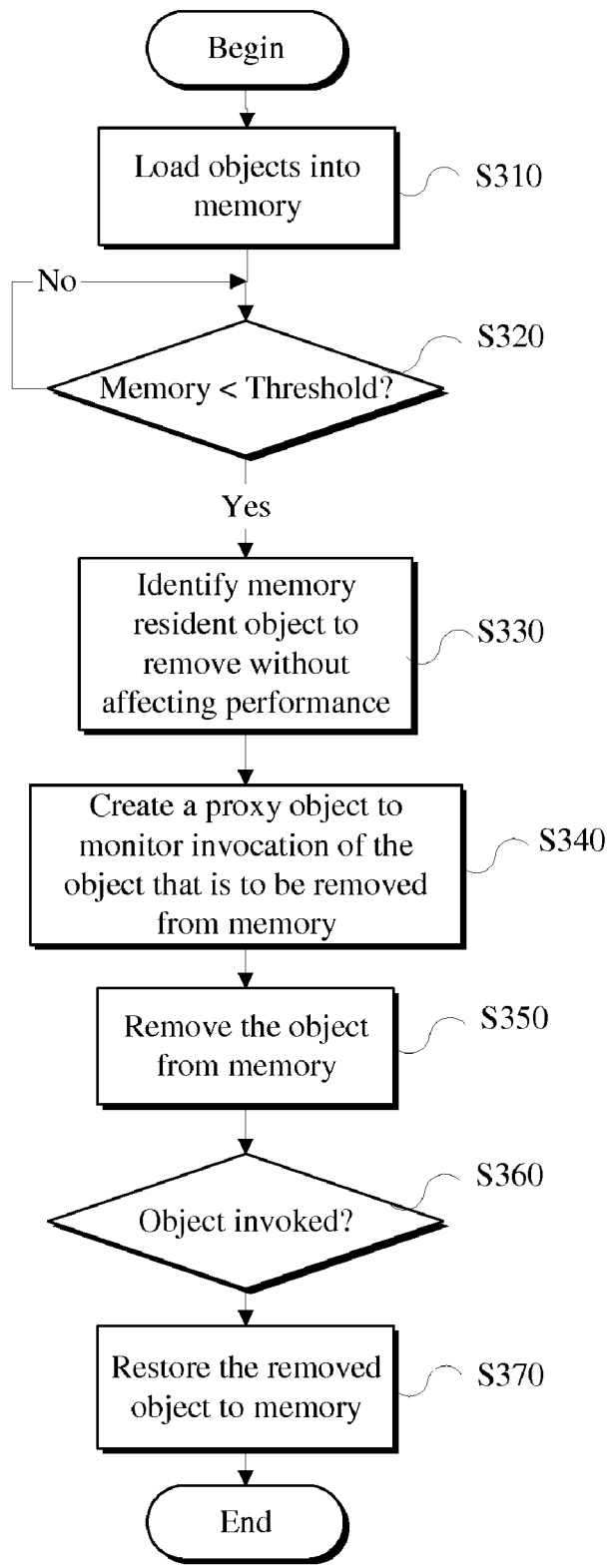
FIG. 3 is a flow diagram of an exemplary self-healing method for monitoring execution of objects in system memory, in accordance with a preferred embodiment.

Referring to FIGS. 1 and 3, a self-healing software application 120 may be implemented with annotations in its components logic code to help identify memory resident objects that can be removed from memory without affecting the system's performance. Once software application 120 is executed, the respective objects are loaded into memory (S310).

Preferably, a runtime monitoring software 140 monitors system memory to determine if available system memory has fallen below a certain threshold (S320). If so, the runtime monitoring software 140 identifies the memory resident objects that can be removed without (i.e., minimally) affecting system performance or functionality (S330) based on the annotation embedded in the logic code of software application's 120 components.

In one embodiment, healing agent 130 creates a proxy object (not shown) to monitor the invocation of a target object that is (or that is to be) removed from memory (S340). Healing agent 130 may remove a target object from memory, either before or after the proxy object is created (S350). In one embodiment, either the healing agent 130 or the runtime monitoring software 140 monitors runtime software environment 110 to determine if the removed object is invoked during execution of software application 120 (S360). If so, the removed object is restored to memory.

Replacing a target object with a proxy object, as noted above, advantageously reduces the object's footprint in the primary memory. This is because the proxy object preferably provides a reference (e.g., arithmetic pointer) to the target object and thus occupies a smaller amount of memory space in comparison to a target object that comprises the entire executable code for a method, for example.

In accordance with one embodiment, the target object once removed from the primary memory is stored in a secondary memory, such as a hard-disk drive, where it can be readily loaded from, in case the target object is invoked. Further, the proxy object is implemented such that in addition to a reference to the target object it also comprises one or more of the interfaces associated with the removed object with the runtime environment, so that when an interface with the runtime environment is activated, monitoring software 140 can determine that the removed object should be restored to primary memory.

In accordance with yet another aspect of the invention, annotations embedded in a component's logic code may provide information about the order in which memory resident objects can be removed from memory. That is, the annotations can be utilized to identify a hierarchical removal order for the memory resident objects, such that the memory resident objects are removed from memory based on at least one or more of the following: (1) the object's size, (2) the object's frequency of invocation, (3) the object's operational importance or other object attributes that affect the system's performance and optimization.

In accordance with an exemplary embodiment, to free the memory allocated to a target object, one or more references to the memory residence objects are set to null and then a garbage collector module is invoked. As noted earlier, a low-memory footprint proxy object is dynamically generated for the annotated component. This proxy object preferably provides the same set of interfaces of the target component and contains a single reference to the target object.

Method invocations for the target object are intercepted by this proxy and forwarded to the target object, if the target object is not removed from memory. If the target object has been already removed from primary memory, healing agent 130 loads the target object from secondary memory where it has been stored, and transparently restarts the object's invocation.

In an exemplary embodiment, healing agent 130 is implemented to register for creation events of objects or components that can be removed from active memory (i.e., dumpable components). Preferably, monitoring software 140 provides two different events during the creation process of a healing enabled component. The first event is the precreate monitor event, for example, that is called before a class object is loaded. The purpose of this event is to enable healing agent 130 to instrument the target class according to a specific annotation.

The second creation event is the creation monitor event which is called when the class is already loaded. The purpose of this event is to start the actual monitoring. This event preferably also provides the size of the object in memory and the time it took to create it. Thus, in one embodiment, healing agent 130 registers to receive a memory related event that will indicate that the used memory has reached a predefined threshold. When this event is received, healing agent 130 is invoked.

In some embodiments, healing agent 130 additionally registers for system's page-faults events; these events indicate that the operating system memory management subsystem is over-utilized. In such cases, the healing agent 130 may decide to avoid operation, allowing the operating system to stabilize, for example. Once the dumpable components are identified and registered, the proxy creation process is completed and a reference to the proxy agent is returned by monitoring software 140. A process that invokes an object, may transparently acquire a read lock on the object, for example, and is preferably blocked when healing agent 130 starts to restore or remove the object to or from system memory.

In accordance with one embodiment, references to the target memory resident objects may be kept in a ring data structure depending on implementation. In a first state (e.g., initialization state), the objects are memory resident. Periodically, healing agent 130 is activated to set the target components' reference bit to zero, for example, and to move them to a second state (e.g., pre-dumped state). Once an object is invoked the reference bit is reset.

Accordingly, when the healer needs to free memory, the ring is scanned to locate the components for which the reference bit is equal to zero. These components are then serialized and the proxy's target object reference is set to null. At this stage, the component's state is changed to a third state (e.g., dumped). Once a predetermined number of such components have been removed (e.g., swapped out) from memory, the garbage collection process is started. In some embodiments, the garbage collection can be started at a later stage or a predetermined time period.

In certain embodiments, accessing a swapped out component, initiates a swapping-in process, in the context of a process that invokes a removed object. Once the object is loaded to system memory, the proxy state changes to a fourth state (e.g., memory resident) and the system proceeds with invocation of the removed object.

In different embodiments, the invention can be implemented either entirely in the form of hardware or entirely in the form of software, or a combination of both hardware and software elements. For example, computing system 100 and software 120, 130 and 140 may comprise a controlled computing system environment that can be presented largely in terms of hardware components and software code executed to perform processes that achieve the results contemplated by the system of the present invention.

Figure 4A:
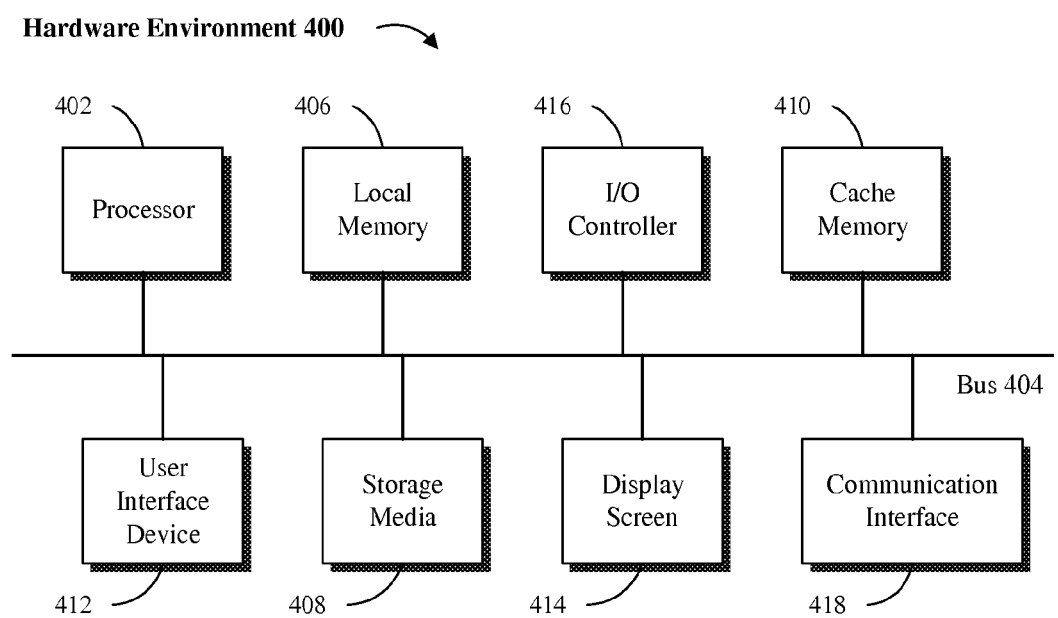
FIGS. 4A and 4B are block diagrams of hardware and software environments in which a system of the present invention may operate, in accordance with one or more embodiments.
Figure 4B:
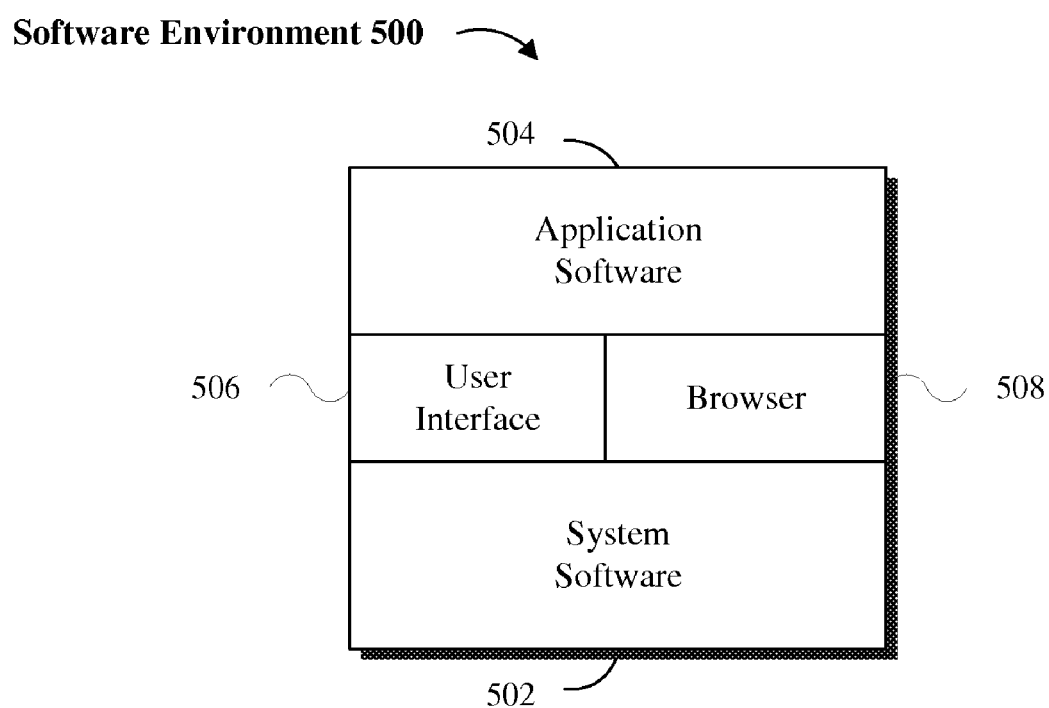

Referring to FIGS. 4A and 4B, a computing system environment in accordance with an exemplary embodiment is composed of a hardware environment 400 and a software environment 500. The hardware environment 400 comprises the machinery and equipment that provide an execution environment for the software; and the software provides the execution instructions for the hardware as provided below.

As provided here, the software elements that are executed on the illustrated hardware elements are described in terms of specific logical/functional relationships. It should be noted, however, that the respective methods implemented in software may be also implemented in hardware by way of configured and programmed processors, ASICs (application specific integrated circuits), FPGAs (Field Programmable Gate Arrays) and DSPs (digital signal processors), for example.

Software environment 500 is divided into two major classes comprising system software 502 and application software 504. System software 502 comprises control programs, such as the operating system (OS) and information management systems that instruct the hardware how to function and process information.

In one embodiment, operating system 112 may be implemented as system software 502 and software application 120, healing agent 130 and monitoring software 140 may be implemented as application software 504 executed on one or more hardware environments to facilitate optimizing software environment 110. Application software 504 may comprise but is not limited to program code, data structures, firmware, resident software, microcode or any other form of information or routine that may be read, analyzed or executed by a microcontroller.

In an alternative embodiment, the invention may be implemented as computer program product accessible from a computer-usable or computer-readable medium providing program code for use by or in connection with a computer or any instruction execution system. For the purposes of this description, a computer-usable or computer-readable medium can be any apparatus that can contain, store, communicate, propagate or transport the program for use by or in connection with the instruction execution system, apparatus or device.

The computer-readable medium can be an electronic, magnetic, optical, electromagnetic, infrared, or semiconductor system (or apparatus or device) or a propagation medium. Examples of a computer-readable medium include a semiconductor or solid-state memory, magnetic tape, a removable computer diskette, a random access memory (RAM), a read-only memory (ROM), a rigid magnetic disk and an optical disk. Current examples of optical disks include compact disk read only memory (CD-ROM), compact disk read/write (CD-R/W) and digital videodisk (DVD).

Referring to FIG. 4A, an embodiment of the application software 504 can be implemented as computer software in the form of computer readable code executed on a data processing system such as hardware environment 400 that comprises a processor 402 coupled to one or more computer readable media or memory elements by way of a system bus 404. The computer readable media or the memory elements, for example, can comprise local memory 406, storage media 408 and cache memory 410. Processor 402 loads executable code from storage media 408 to local memory 406. Cache memory 410 provides temporary storage to reduce the number of times code is loaded from storage media 408 for execution.

A user interface device 412 (e.g., keyboard, pointing device, etc.) and a display screen 414 can be coupled to the computing system either directly or through an intervening I/O controller 416, for example. A communication interface unit 418, such as a network adapter, may be also coupled to the computing system to enable the data processing system to communicate with other data processing systems or remote printers or storage devices through intervening private or public networks. Wired or wireless modems and Ethernet cards are a few of the exemplary types of network adapters.

In one or more embodiments, hardware environment 400 may not include all the above components, or may comprise other components for additional functionality or utility. For example, hardware environment 400 may be a laptop computer or other portable computing device embodied in an embedded system such as a set-top box, a personal data assistant (PDA), a mobile communication unit (e.g., a wireless phone), or other similar hardware platforms that have information processing and/or data storage and communication capabilities.

In certain embodiments of the system, communication interface 418 communicates with other systems by sending and receiving electrical, electromagnetic or optical signals that carry digital data streams representing various types of information including program code. The communication may be established by way of a remote network (e.g., the Internet), or alternatively by way of transmission over a carrier wave.

Referring to FIG. 4B, application software 504 can comprise one or more computer programs that are executed on top of system software 502 after being loaded from storage media 408 into local memory 406. In a client-server architecture, application software 504 may comprise client software and server software. For example, in one embodiment of the invention, client software is executed on computing systems 110 or 120 and server software is executed on a server system (not shown).

Software environment 500 may also comprise browser software 508 for accessing data available over local or remote computing networks. Further, software environment 500 may comprise a user interface 506 (e.g., a Graphical User Interface (GUI)) for receiving user commands and data. Please note that the hardware and software architectures and environments described above are for purposes of example, and one or more embodiments of the invention may be implemented over any type of system architecture or processing environment.

It should also be understood that the logic code, programs, modules, processes, methods and the order in which the respective steps of each method are performed are purely exemplary. Depending on implementation, the steps may be performed in any order or in parallel, unless indicated otherwise in the present disclosure. Further, the logic code is not related, or limited to any particular programming language, and may comprise of one or more modules that execute on one or more processors in a distributed, non-distributed or multi-processing environment.

Therefore, it should be understood that the invention can be practiced with modification and alteration within the spirit and scope of the appended claims. The description is not intended to be exhaustive or to limit the invention to the precise form disclosed. These and various other adaptions and combinations of the embodiments disclosed are within the scope of the invention and are further defined by the claims and their full scope of equivalents.

What is claimed is:

1. A computer-implemented method for optimizing performance in a computing environment, the method comprising:
    annotating logic code associated with a software component; and
    monitoring execution of the annotated logic code to determine whether a condition has been satisfied, wherein annotations in the logic code provide one or more details about the software component, the details being useful to a healing agent to correct or prevent a problem associated with said condition during the execution of the logic code,
    wherein the healing agent's actions to correct or prevent a problem result in instantiation of a proxy object with a first memory footprint,
    wherein the proxy object provides a reference to a target object with a second memory footprint larger than the first memory footprint,
    wherein the target object is removed from execution environment of the logic code, based on a determination that the target object is not immediately needed for proper execution and that removal of the target object would help optimize the execution of the logic code, and
    wherein in response to invocation of the target object, the proxy object provides a reference to help restore the removed target object; wherein logic code for the healing agent is independent of the software component, so that a first healing logic code for correcting the problem can be replaced by a second healing logic code without substantially modifying logic code for the software component.

2. The method of claim 1, further comprising invoking a healing agent to correct the problem according to the one or more details.

3. The method of claim 1, wherein the one or more details provide information about a logic type or category to which the software component belongs.

4. The method of claim 1, wherein the healing agent provides automated instructions on how to annotate the logic code to indicate location and type of annotations to be placed in the logic code.

5. The method of claim 1, wherein the one or more details provide information about at least one parameter of relevance to healing of the software component.

6. The method of claim 1, wherein the one or more details provide information about a preferred healing procedure.

7. The method of claim 1, wherein the one or more details provide information about a first healing procedure to be performed by the healing agent.

8. The method of claim 2, wherein the one or more details provide information about the condition in response to which the healing agent is invoked.

9. The method of claim 1, wherein logic code for the healing agent is embedded in the software component.

10. A system for optimizing performance in a computing environment, the system comprising:
    one or more processing units, in communication with data storage media units, for executing logic code stored on said data storage media;
    means for monitoring execution of annotated logic code associated with a software component to determine whether a condition has been satisfied, wherein annotations in the logic code provide one or more details about the software component, the details being useful to a healing agent to correct or prevent a problem associated with said condition during the execution of the logic code,
    wherein the healing agent's actions to correct or prevent a problem result in instantiation of a proxy object with a first memory footprint,
    wherein the proxy object provides a reference to a target object with a second memory footprint larger than the first memory footprint,
    wherein the target object is removed from execution environment of the logic code, based on a determination that the target object is not immediately needed for proper execution and that removal of the target object would help optimize the execution of the logic code, and wherein in response to invocation of the target object, the proxy object provides a reference to help restore the removed target object; wherein logic code for the healing agent is independent of the software component, so that a first healing logic code for correcting the problem can be replaced by a second healing logic code without substantially modifying logic code for the software component.

11. The system of claim 10, further comprising means for invoking a healing agent to correct the problem according to the one or more details.

12. The method of claim 10, wherein the one or more details provide information about a logic category to which the software component belongs.

13. The method of claim 10, wherein the healing agent provides automated instructions on how to annotate the logic code to indicate location and type of annotations to be placed in the logic code.

14. The method of claim 10, wherein the one or more details provide information about a first healing procedure to be performed by the healing agent.

15. A computer program product comprising a non-transitory computer useable medium having a computer readable program, wherein the computer readable program when executed on a computer causes the computer to:

monitor execution of annotated logic code associated with a software component to determine whether a condition has been satisfied, wherein annotations in the logic code provide one or more details about the software component, the details being useful to a healing agent to correct a problem associated with said condition during the execution of the logic code, wherein the healing agent's actions to correct or prevent a problem result in instantiation of a proxy object with a first memory footprint, wherein the proxy object provides a reference to a target object with a second memory footprint larger than the first memory footprint, wherein the target object is removed from execution environment of the logic code, based on a determination that the target object is not immediately needed for proper execution and that removal of the target object would help optimize the execution of the logic code, and wherein in response to invocation of the target object, the proxy object provides a reference to help restore the removed target object; wherein logic code for the healing agent is independent of the software component, so that a first healing logic code for correcting the problem can be replaced by a second healing logic code without substantially modifying logic code for the software component.

16. The computer program product of claim 15, wherein the computer readable program when executed on a computer further causes the computer to invoke a healing agent to correct the problem according to the one or more details.

17. The computer program product of claim 15, wherein the one or more details provide information about a first healing procedure to be performed by the healing agent.

* * * * *